(12) United States Patent
Liang

(10) Patent No.: US 11,163,978 B2
(45) Date of Patent: Nov. 2, 2021

(54) METHOD AND DEVICE FOR FACE IMAGE PROCESSING, STORAGE MEDIUM, AND ELECTRONIC DEVICE

(71) Applicant: GUANGDONG OPPO MOBILE TELECOMMUNICATIONS CORP., LTD., Guangdong (CN)

(72) Inventor: Kun Liang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 50 days.

(21) Appl. No.: 16/700,584

(22) Filed: Dec. 2, 2019

(65) Prior Publication Data

US 2020/0104568 A1    Apr. 2, 2020

Related U.S. Application Data

(63) Continuation of application No. PCT/CN2017/091352, filed on Jun. 30, 2017.

(51) Int. Cl.
*G06K 9/00* (2006.01)
(52) U.S. Cl.
CPC ..... *G06K 9/00248* (2013.01); *G06K 9/00281* (2013.01); *G06K 9/00288* (2013.01)
(58) Field of Classification Search
CPC .......... G06K 9/00248; G06K 9/00281; G06K 9/00288
See application file for complete search history.

(56) References Cited

U.S. PATENT DOCUMENTS

| 9,286,706 | B1 | 3/2016 | Krishnaswamy et al. |
| 2003/0063777 | A1 | 4/2003 | Trajkovic et al. |
| 2006/0280380 | A1 | 12/2006 | Li |
| 2008/0273761 | A1* | 11/2008 | Kawata ............... G06K 9/6271 382/115 |

(Continued)

FOREIGN PATENT DOCUMENTS

| CN | 103605965 A | 2/2014 |
| CN | 103793693 A | 5/2014 |

(Continued)

OTHER PUBLICATIONS

Extended European search report issued in corresponding European application No. 17916284.7 dated Jun. 9, 2020.

(Continued)

*Primary Examiner* — Md K Talukder
(74) *Attorney, Agent, or Firm* — Young Basile Hanlon & MacFarlane, P.C.

(57) ABSTRACT

A method for face image processing is provided. The method includes the follows. A face image is recognized to obtain a recognition result. An image adjustment parameter set is obtained according to the recognition result. A deflection angle of a face in the face image relative to a reference face in a reference face image is determined. A target image adjustment parameter is selected from the image adjustment parameter set according to the deflection angle. The face image is processed according to the target image adjustment parameter. A device for face image processing, a storage medium, and an electronic device are further provided.

15 Claims, 10 Drawing Sheets

(56) References Cited

U.S. PATENT DOCUMENTS

| | | | | |
|---|---|---|---|---|
| 2013/0147845 A1* | 6/2013 | Xie | ............... | H04L 67/2823 |
| | | | | 345/660 |
| 2015/0199560 A1* | 7/2015 | Gokturk | ............. | G06F 16/5866 |
| | | | | 382/195 |
| 2016/0267340 A1* | 9/2016 | Jensen | ............... | G06K 9/00885 |
| 2016/0379041 A1* | 12/2016 | Rhee | ................... | G06K 9/6296 |
| | | | | 382/118 |
| 2017/0124383 A1* | 5/2017 | Bitsu | ................ | G06K 9/00268 |
| 2020/0104568 A1* | 4/2020 | Liang | ................ | G06K 9/00248 |

FOREIGN PATENT DOCUMENTS

| | | |
|---|---|---|
| CN | 105069007 A | 11/2015 |
| CN | 105530435 A | 4/2016 |
| CN | 103927719 B | 5/2017 |

OTHER PUBLICATIONS

International search report issued in corresponding international application No. PCT/CN2017/091352 dated Apr. 8, 2018.
Indian Examination Report for IN Application 201917049174 dated Jun. 17, 2021. (7 pages).

\* cited by examiner

METHOD AND DEVICE FOR FACE IMAGE PROCESSING, STORAGE MEDIUM, AND ELECTRONIC DEVICE

CROSS-REFERENCE TO RELATED APPLICATION(S)

This application is a continuation of International Application No. PCT/CN2017/091352, filed on Jun. 30, 2017, the disclosure of which is hereby incorporated by reference in its entirety.

TECHNICAL FIELD

This disclosure relates to the technical field of face image processing, and more particularly to a method and device for face image processing, a storage medium, and an electronic device.

BACKGROUND

With the development of Internet and mobile communication network, and with the rapid enhancement in processing capacity and storage capacity of electronic devices, massive applications have been rapidly popularized and used. Especially for applications related to face image processing, a face image processing function becomes more and more powerful. At present, many camera-related applications can provide a convenient and fast photo beautification function, which can realize instant optimization of photo effects with a simple operation.

SUMMARY

In a first aspect of the present disclosure, a method for face image processing is provided. A face image is recognized to obtain a recognition result. An image adjustment parameter set is obtained according to the recognition result. A deflection angle of a face in the face image relative to a reference face in a reference face image is determined. A target image adjustment parameter is selected from the image adjustment parameter set according to the deflection angle. The face image is processed according to the target image adjustment parameter.

In a second aspect of the present disclosure, a non-transitory computer readable storage medium is provided. The non-transitory computer readable storage medium is configured to store instructions. The instructions, when executed by a processor, cause the processor to carry out part or all of the operations described in any method of the first aspect of the embodiments.

In a third aspect of the present disclosure, an electronic device is provided. The electronic device includes a computer readable storage and at least one processor. The computer readable storage is coupled to the at least one processor and stores at least one computer executable instruction thereon which, when executed by the at least one processor, is operable with the at least one processor to: recognize a face image to obtain a recognition result; obtain an image adjustment parameter set according to the recognition result; determine a deflection angle of a face in the face image relative to a reference face in a reference face image; select a target image adjustment parameter from the image adjustment parameter set according to the deflection angle; and process the face image according to the target image adjustment parameter.

BRIEF DESCRIPTION OF DRAWINGS

In order to describe technical solutions of embodiments more clearly, the following will give a brief description of accompanying drawings used for describing the embodiments. Apparently, accompanying drawings described below are merely some embodiments. Those of ordinary skill in the art can also obtain other accompanying drawings based on the accompanying drawings described below without creative efforts.

DETAILED DESCRIPTION

Figure 1:
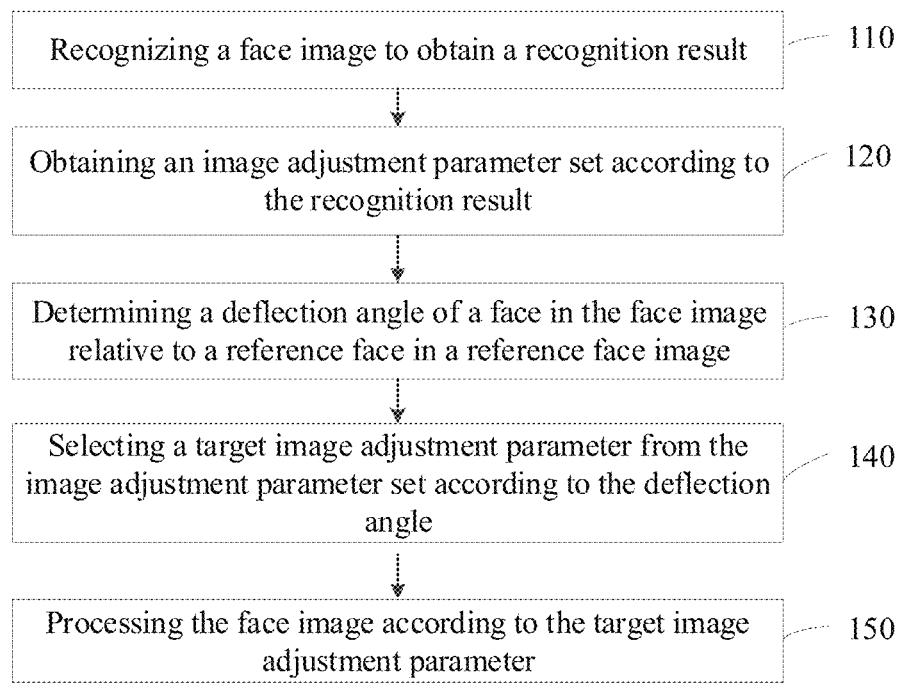
FIG. 1 is a schematic flowchart illustrating a method for face image processing according to embodiments.

Hereinafter, technical solutions of embodiments will be described in a clear and comprehensive manner with reference to the accompanying drawings intended for the embodiments. It is evident that the embodiments described herein constitute merely some rather than all of the embodiments. All other embodiments obtained by those of ordinary skill in the art based on the embodiments without creative efforts shall fall within protection scope of the present disclosure.

The terms "first", "second", "third", and the like (if present) used in the specification, claims, and drawings of the present disclosure are intended for distinguishing different objects rather than describing a particular order or a sequential order. It should be understood that the objects so described are interchangeable where appropriate. In addition, the terms "include", "comprise", "have" and any variations thereof are intended to cover non-exclusive inclusion. Such as a process and method that includes a series of steps, or an apparatus, electronic device, and system that includes a series of modules or units, is not limited to the listed steps or units, but optionally may also include steps or units not listed, or alternatively other steps or units inherent to these processes, methods, apparatuses, electronic device, or system.

Hereinafter, embodiments of the present disclosure will be described in detail.

According to an embodiment, a method for face image processing is provided. A face image is recognized to obtain a recognition result. An image adjustment parameter set is obtained according to the recognition result. A deflection angle of a face in the face image relative to a reference face in a reference face image is determined. A target image adjustment parameter is selected from the image adjustment parameter set according to the deflection angle. The face image is processed according to the target image adjustment parameter.

According to an embodiment, a non-transitory computer readable storage medium is provided. The non-transitory computer readable storage medium is configured to store instructions. The instructions, when executed by a processor, cause the processor to carry out following actions. A face image is recognized to obtain a recognition result. An image adjustment parameter set is obtained according to the recognition result. A deflection angle of a face in the face image relative to a reference face in a reference face image is determined. A target image adjustment parameter is selected from the image adjustment parameter set according to the deflection angle. The face image is processed according to the target image adjustment parameter.

According to an embodiment, an electronic device is provided. The electronic device includes a computer readable storage and at least one processor. The computer readable storage is coupled to the at least one processor and stores at least one computer executable instruction thereon which, when executed by the at least one processor, is operable with the at least one processor to: recognize a face image to obtain a recognition result; obtain an image adjustment parameter set according to the recognition result; determine a deflection angle of a face in the face image relative to a reference face in a reference face image; select a target image adjustment parameter from the image adjustment parameter set according to the deflection angle; and process the face image according to the target image adjustment parameter.

Embodiments will be detailed below with reference to the accompanying drawings.

According to embodiments, a method for face image processing is provided. As illustrated in FIG. 1, the method for face image processing includes the following.

At block 110, a face image is recognized to obtain a recognition result.

In embodiments, the face image may be any image that is obtained by shooting or scanning a face with a camera, a scanner, or the like. The face image can be obtained in a variety of manners. As an example, the face image is collected by an electronic device through a camera of the electronic device in real time or is pre-stored in the electronic device. As another example, the face image is obtained from a network. Specifically, the face image is obtained from a message sent by a friend through an Instant Messenger App (e.g., WeChat®). Face image recognition can be comprehended as recognizing a face in the face image.

Face recognition is a biometric recognition technology based on human face feature information to identity a person. Generally, a face recognition system mainly relates to four aspects, namely: face-image acquisition and detection, face-image preprocessing, face-image feature extraction, and matching and recognition.

In some embodiments, an original image cannot be used directly because the original image is often limited by various conditions and subjected to random interference. For this reason, at an early stage of image processing, it is necessary to pre-process (e.g., gradation correction, noise filtering, etc.) the original image after the face image is obtained. Then features of the face image are extracted by representation methods based on knowledge, and algebra features, or statistical learning. For example, information such as histogram features, color features, template features, structural features, and so on can be extracted from the face image, useful information is then selected from such information extracted to implement face detection.

For example, after features are extracted, the face image is recognized according to the extracted features as follows. Feature templates stored in a database are searched according to extracted feature data of the face image. When a similarity between the extracted feature data and a feature template exceeds a setting threshold, a search result (that is, the feature template) is outputted and face features to-be-recognized are compared with the face feature template obtained. The face in the face image is identified according to similarity between the face featured extracted and the face feature template to obtain a recognition result.

In some embodiments, face image information may be analyzed by means of a specified classification model. The classification model may be a trained deep neural network based on machine deep learning, such as a convolutional neural network (CNN). The CNN is a multi-layer neural network comprising an input layer, a convolution layer, a pooling layer, a fully connected layer, and an output layer. CNN allows direct input of an image of multi-dimensional input vectors, which avoids data reconstruction in feature extraction and classification, and thus reduces complexity of image processing. Upon input of target image information into the CNN, the target image information is transmitted from the input layer to the output layer through a multi-stage transformation. Calculation performed in the CNN generally relates to a dot product between an input (i.e., the face image) and a weight matrix of each layer to obtain a final output (e.g., gender, age, personal-identity, etc.).

A CNN model is obtained by training according to samples and classification information in advance. For example, a large number of sample face images can be collected in advance, and each sample face image can be manually marked with information (e.g., gender, age, identity, etc.) of a person to which the face image belongs. These sample face images are then input into the CNN for training. The training mainly includes two phases, that is, a forward propagation phase and a backward propagation phase. In the forward propagation phase, each sample $X_i$ (i.e., a sample image) can be input into an n-layer convolutional neural network to obtain an actual output $O_i$, where $O_i = F_n(\ldots (F_2(F_1(X_iW(1))W(2)))\ldots)W(n))$, i is a positive integer, $W(n)$ is a weight of an $n^{th}$ layer, and F is an activation function (e.g., a sigmoid function or a hyperbolic tangent function). A weight matrix can be obtained by inputting sample images into the convolutional neural network. Thereafter, in the backward propagation phase, a difference between each actual output $O_i$ and an ideal output $Y_i$ can be calculated, and the weight matrix is adjusted by backward propagation according to an error minimization method, where $Y_i$ is obtained according to the marked information of sample $X_i$. For instance, if sample image $X_i$ is marked that the gender is female, then $Y_i$ is set to 1; if sample image $X_i$ is marked that the gender is male, then $Y_i$ is set to 0. Finally, trained convolutional neural network is determined according to the weight matrix adjusted, and images can be intelligently analyzed through the trained convolutional neural network. In this way, information such as the gender, age, personal-identity, and the like of a person in the image can be accurately determined as a recognition result.

At block 120, an image adjustment parameter set is obtained according to the recognition result.

In embodiments, the image adjustment parameter set includes multiple groups of image adjustment parameters (i.e., multiple image adjustment parameter groups). The image adjustment parameters are historical image adjustment parameters of the face in the face image, that is, previously-used image adjustment parameters. In some embodiments, the electronic device can record processing habits for different face images in a time period in the past, and can analyze and learn the processing habits of the user in the time period based on machine learning. The electronic device can generate image adjustment parameters for processing different face images through self-analysis and self-learning processes, to obtain different image adjustment parameter sets.

In some embodiments, an image adjustment parameter includes a luminance value, a exposure value, contrast, sharpness, a liquefaction value, a pixel blur radius, and other parameter values, which are not enumerated herein.

In practice, influence of external factors or issues with a face image per se may cause recognition failure. For example, when face comparison is performed, comparison failure may occur if there is a discrepancy between a face in a face image stored in advance and the face in a face image to be recognized, the discrepancy includes: changes in beard, changes in hair style, changes in accessories such as glasses, changes in expression, and so on. When the recognition of the face image fails, the user can manually determine the recognition result. For instance, when receiving a result selection instruction triggered by a user through a display screen, the electronic device obtains and displays a result list according to the result selection instruction, and uses a target result selected from the result list as the recognition result. Then, the electronic device can obtain a image adjustment parameter set corresponding to the recognition result.

In some embodiments, the recognition result includes a personal-identity. The personal-identity is used to distinguish the person to whom the face in the face image stored in the electronic device belongs. The personal-identity includes, but is not limited to, an identity number, name, nickname, a serial number, or other information that is able to group face images of a same person into one category.

In some embodiments, the image adjustment parameter set is obtained according to the recognition result as follows. A preset personal-identity that matches the personal-identity is obtained from a preset identity set. A preset image adjustment parameter set corresponding to the preset personal-identity is obtained, and the preset image adjustment parameter set is used as the recognition result to obtain the image adjustment parameter set.

In above embodiments, a correspondence relationship between personal-identities and image adjustment parameter sets is set in advance. In other words, image adjustment parameters corresponding to face images belonging to a same person will be grouped into a same image adjustment parameter set. As an example, when personal identity of a face image is recognized, once the personal-identity is recognized, the preset image adjustment parameter set is obtained from multiple image adjustment parameter sets according to the personal-identity.

At block 130, a deflection angle of a face in the face image relative to a reference face in a reference face image is determined.

The reference face image is used as a reference and may be any image that includes a face belonging to a same person as the face in the face image to be recognized.

Figure 2:
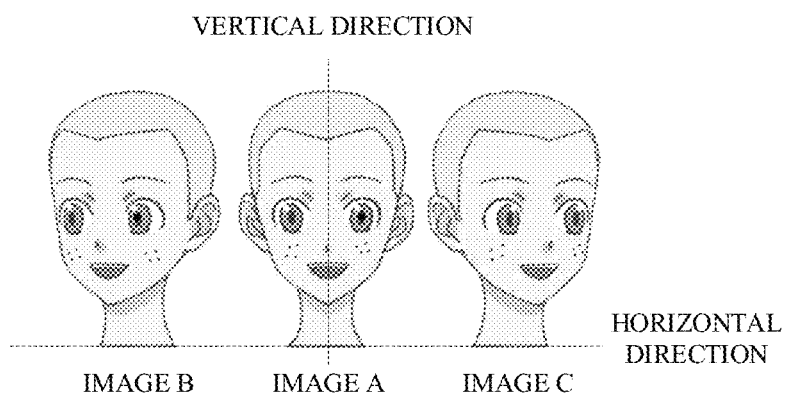
FIG. 2 is a schematic diagram illustrating face images according to embodiments.

For example, as illustrated in FIG. 2, image A is a front-view image of a face in a face image. Image A is used as a reference face image, then image B is a left-deflection image of the face in image A, and a deflection angle of the face in image B relative to the face in image A is horizontally to the left by 45° Likewise, image C is a right-deflection image of the face in image A, and a deflection angle of the face in image C relative to the face in image A is horizontally to the right by 45°. For another example, Image B is used as a reference face image, a deflection angle of the face in image A relative to the face in image B is horizontally to the right by 45°, and a deflection angle of the face in image C relative to the face in image B is horizontally to the right by 90°. Any of image A, image B, and image C can be used as a reference face image.

At block 140, a target image adjustment parameter is selected from the image adjustment parameter set according to the deflection angle.

In practice, images taken at different angles are different, and so image adjustment parameters required for the images taken at different angles are different.

In embodiments, multiple groups of image adjustment parameters included in the image adjustment parameter set may include image adjustment parameters required for face images of different angles to achieve a preset effect such as a picture effect. For instance, a front-view image of a face and a side-view image of the same face are different, and accordingly, image adjustment parameters required for the front-view face image are different from image adjustment parameters required for the side-view face image. For example, there is a scar in the left face while no scar in the right face, when due to the shooting angle, most of the left face is presented in the face image and the scar in the left face is exposed, the scar appeared in the face image needs to be processed; on the other hand, when most of the right face is presented in the face image and the scar in the left face cannot be seen, no scar-related process is needed for the face image. Therefore, according to the deflection angle of the face in the face image relative to the reference face in the reference face image, an orientation of the face in the face image can be determined, and the target image adjustment parameter to-be-selected can be determined.

In some embodiments, the target image adjustment parameter is selected from the image adjustment parameter set according to the deflection angle as follows. A target angle interval to which the deflection angle belongs is determined from multiple preset angle intervals. A preset image adjustment parameter corresponding to the target angle interval is obtained from the image adjustment parameter set. The preset image adjustment parameter is used as the target image adjustment parameter.

The multiple preset angle intervals may be obtained by the electronic device by deep-learning user behavior habits for a period of time and analyzing the same.

At block 150, the face image is processed according to the target image adjustment parameter.

In embodiments, the manner in which the face image is processed according to the target image adjustment parameter may be various. As an example, an area to-be-adjusted in the face image is determined according to the target image adjustment parameter, and the area determined is adjusted according to the target image adjustment parameter obtained.

In some embodiments, image features of the face image is adjusted according to the target image adjustment parameter to process the face image. In this case, the face image is processed according to the target image adjustment parameter as follows. Multiple image features of the face image are obtained. For each of multiple image features, an initial layer corresponding to thereto is generated, to obtain a layer set. According to the target image adjustment parameter, at least one target layer is selected from the layer set and the at least one target layer is adjusted. The at least one target layer adjusted is combined with unselected initial layers in the layer set.

In some embodiments, the multiple image features may include color features, shape features, texture features, and spatial relationship features. In some embodiments, the face image is analyzed, and an initial layer corresponding to each image feature is generated according to a analysis result. For example, a color feature corresponds to a color layer that characterizes colors of the face image, and a shape feature corresponds to a shape layer that characterizes shape of the face image.

Since not all image features need to be modified, there may be parameters having a null value in the target image adjustment parameter (group), therefore, only parameters whose values are not null in the target image adjustment parameter are used. Accordingly, at least one target layer corresponding to at least one feature to-be-modified is selected for adjustment from a layer set according to at least one parameter whose value is not null, to obtain at least one target layer adjusted. The at least one target layer adjusted is then combined with remaining unadjusted initial layers to synthesize a processed face image.

Figure 7:
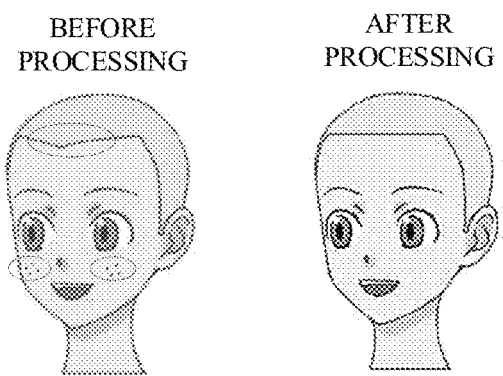
FIG. 7 is a schematic comparison diagram illustrating face images before and after face image processing according to embodiments.

As illustrated in FIG. 7, compared to an unprocessed face image, in a processed face image in FIG. 7, shape features, texture features, and color features are processed. Specifically, the luminance of the face image is enhanced, the sharpness of the face image is improved, the contrast of the face image is enhanced, localized skinning is applied, hairstyle is modified, and the like.

Figure 3:
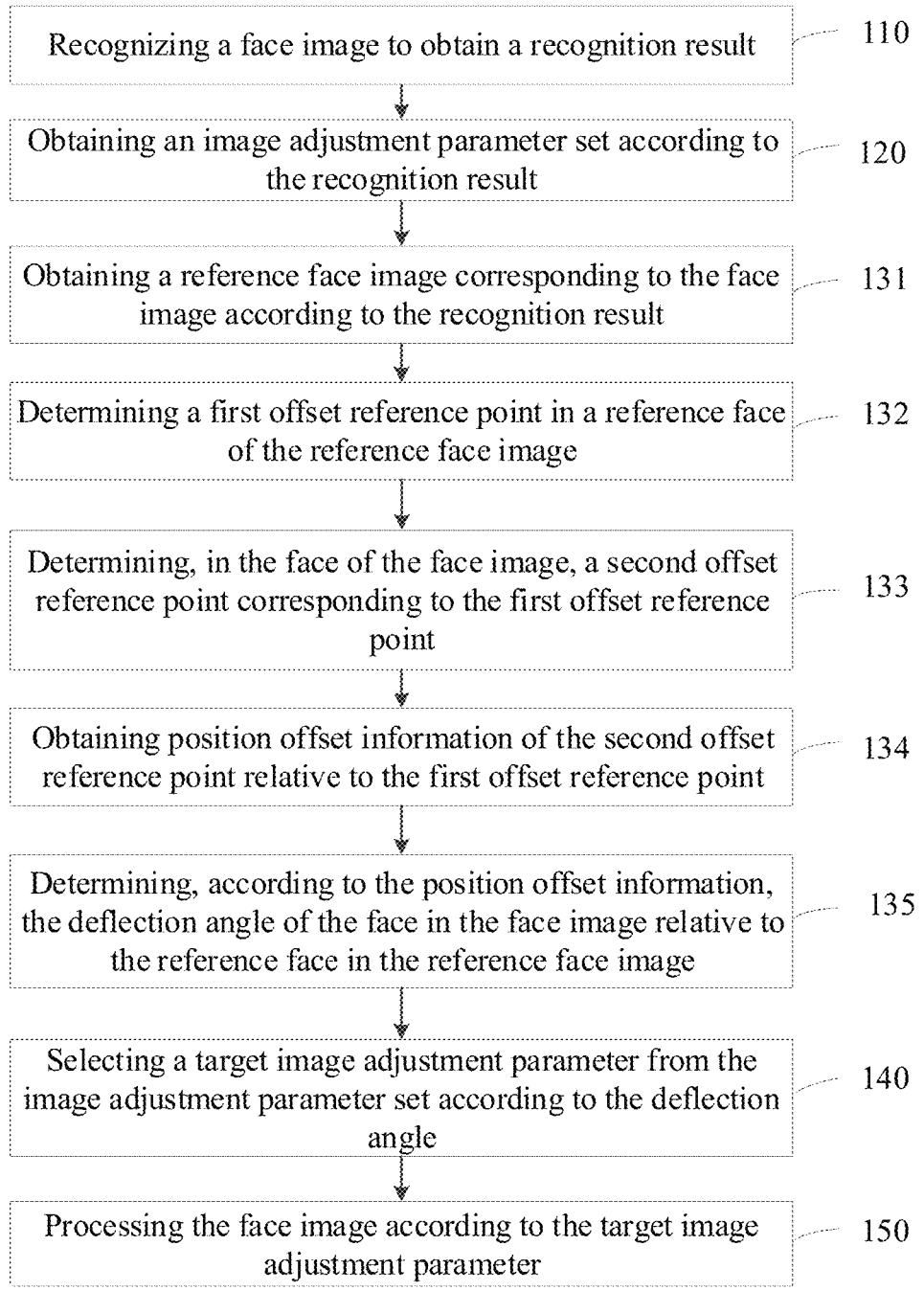
FIG. 3 is a schematic flowchart illustrating a method for face image processing according to other embodiments.

In some embodiments, as illustrated in FIG. 3, the deflection angle of the face in the face image relative to the reference face in the reference face image is determined as follows. At block 131, the reference face image corresponding to the face image is obtained according to the recognition result. At block 132, a first offset reference point in the reference face of the reference face image is determined. At block 133, a second offset reference point corresponding to the first offset reference point is determined in the face of the face image. At block 134, position offset information of the second offset reference point relative to the first offset reference point is obtained. At block 135, the deflection angle of the face in the face image relative to the reference face in the reference face image is determined according to the position offset information.

Figure 4:
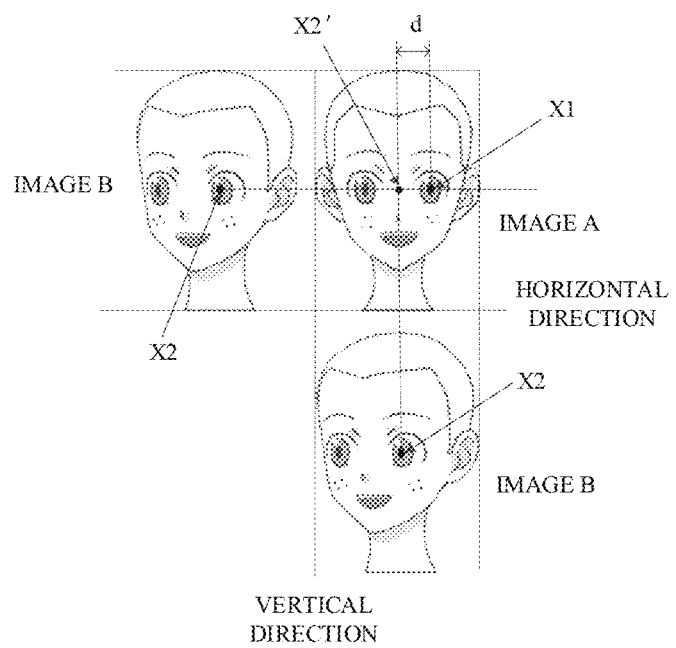
FIG. 4 is a schematic diagram illustrating face images according to other embodiments.

In some embodiments, the position offset information includes an offset distance and an offset direction. The following describes a front-view face image as an example of the reference face image. As illustrated in FIG. 4, using image A as the reference face image, a first offset reference point $X_1$ (corresponding to a pupil) is determined in image A. Using image B as the currently obtained face image, a second offset reference point $X_2$ (corresponding to the pupil) is determined in image B according to the first offset reference point $X_1$. As an example, a position of the second offset reference point $X_2$ is decomposed through a graphic method, and an equivalent point $X_2'$ corresponding to the second offset reference point $X_2$ is determined in image A. As illustrated in FIG. 4, there is no distance difference in a vertical direction between the equivalent point $X_2'$ and the first offset reference point $X_1$, and the equivalent point $X_2'$ offsets horizontally to the left (referred to as "offset direction") by distance d (referred to as "offset distance") with respect to the first offset reference point $X_1$. Then, the offset distance and the offset direction obtained are taken into a corresponding deflection angle-related algorithm obtained, to obtain the deflection angle.

Figure 5:
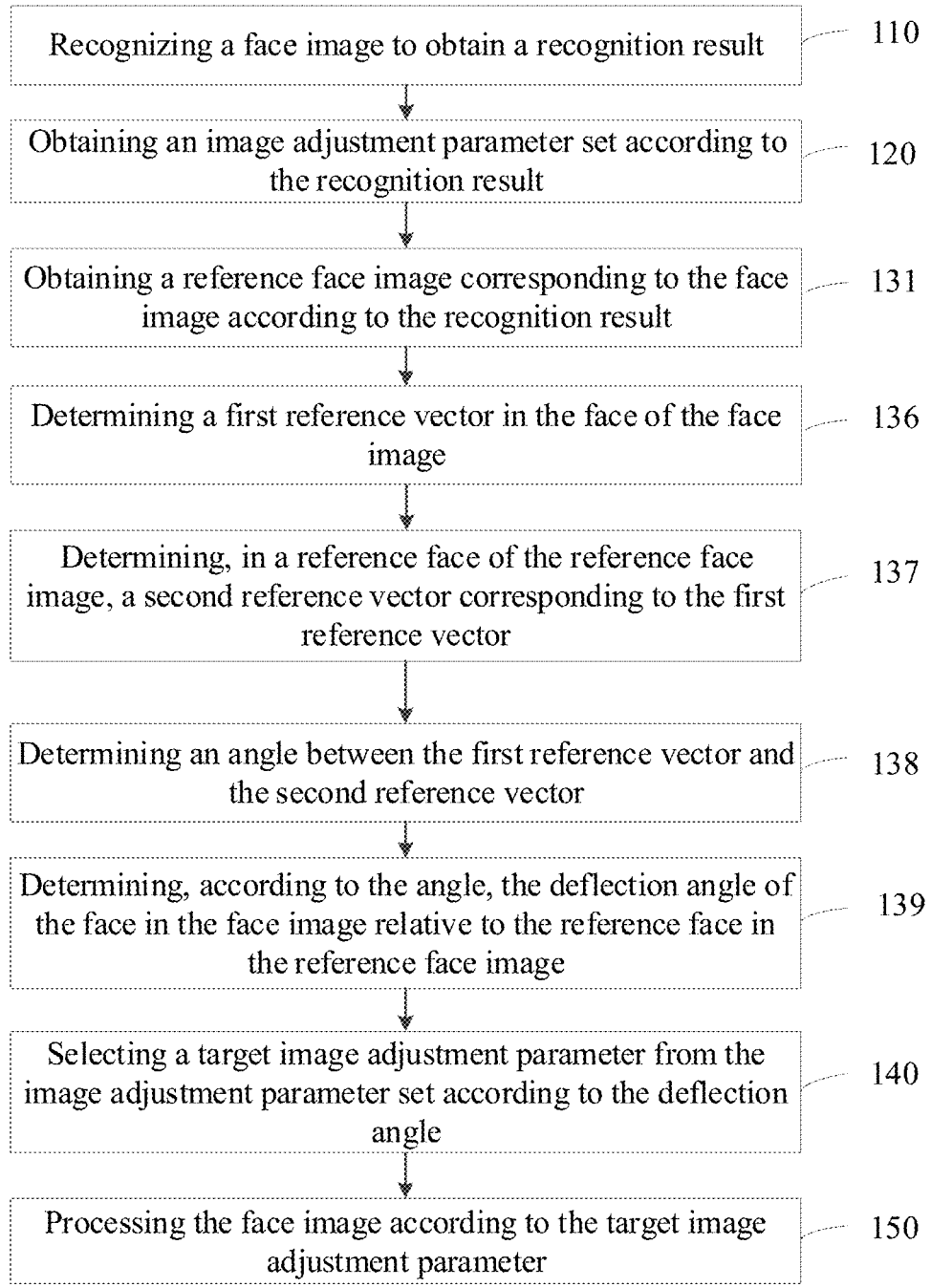
FIG. 5 is a schematic flowchart illustrating a method for face image processing according to other embodiments.

In some embodiments, as illustrated in FIG. 5, the angle of deflection of the face in the face image relative to the reference face in the reference face image is determined as follows. At block 131, the reference face image corresponding to the face image is obtained according to the recognition result. At block 136, a first reference vector in the face of the face image is determined. At block 137, a second reference vector corresponding to the first reference vector is determined in the reference face of the reference face image. At block 138, an angle between the first reference vector and the second reference vector is determined. At block 139, the deflection angle of the face in the face image relative to the reference face in the reference face image is determined according to the angle.

In embodiments, the manner in which the first reference vector is determined may be various. As an example, feature points of the reference face image are obtained to obtain a feature-point set, and then any two representative target feature points are selected from the feature-point set to obtain the first reference vector. As an example, the first reference vector in the face of the face image is determined as follows. A first feature point and a second feature point in the face image are determined. The first reference vector is determined according to the first feature point and the second feature point.

Figure 6:
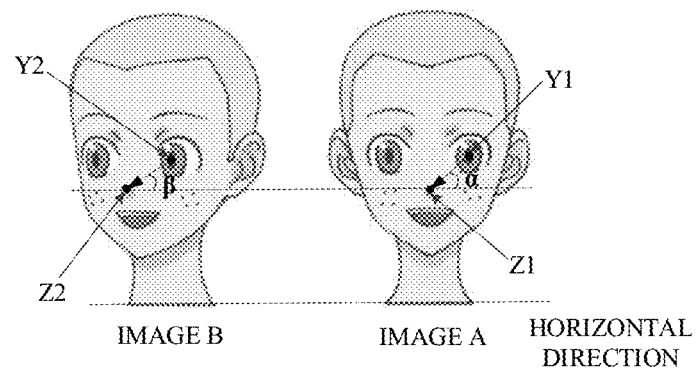
FIG. 6 is a schematic diagram illustrating face images according to other embodiments.

The following describes a front-view face image as an example of the reference face image. As illustrated in FIG. 6, using image A as the reference face image. A first feature point $Y_1$ (corresponding to a pupil) and a second feature point $Z_1$ (corresponding to a nose) are determined in image A, to obtain a first reference vector a in a direction of $Y_1$ to $Z_1$. Using image B as the currently obtained face image. A third feature point $Y_2$ (corresponding to the pupil) in image B is determined according to the first feature point $Y_1$ and a fourth feature point $Z_2$ (corresponding to the nose) in image B is determined according to the second feature point $Z_1$, to obtain a second reference vector b in a direction of $Y_2$ to $Z_2$.

In embodiments, the manner in which the angle between the first reference vector and the second reference vector is determined may be various. In some embodiments, the angle between the first reference vector a and the second reference vector b can be directly calculated using a formula. In some embodiments, as illustrated in FIG. 6, an angle α between the first reference vector a and a horizontal plane and an angle β between the second reference vector b and the horizontal plane can be calculated respectively, and a difference between the angle α and the angle β is determined as the angle between the first reference vector and the second reference vector.

In some embodiments, a deflection angle-related algorithm is invoked, the angle obtained is taken into the deflection angle-related algorithm, and the deflection angle is obtained through operation.

Likewise, methods of embodiments are further applicable to processing of a face image that produces certain angle deflection in a vertical direction, as well as processing of a face image that simultaneously produces certain angle deflection in a horizontal direction and a vertical direction. For details, reference may be made to the related descriptions in the foregoing processing method, and it will not be described in further detail herein.

According to the method for face image processing of embodiments, the recognition result can be obtained by recognizing the face image. The image adjustment parameter set is obtained according to the recognition result. The deflection angle of the face in the face image relative to the reference face in the reference face image is determined. The target image adjustment parameter is selected from the image adjustment parameter set according to the deflection angle determined. The face image is processed according to the target image adjustment parameter. By adopting the present disclosure, according to the result of the recognition of the face image and the deflection angle of the face in the face image, the target image adjustment parameter can be determined from the image adjustment parameter set to process the face image, without manually determining how to adjust the face image, which can improve speed and efficiency of image processing and reduce operating time while reducing power consumption of an electronic device.

Figure 8:
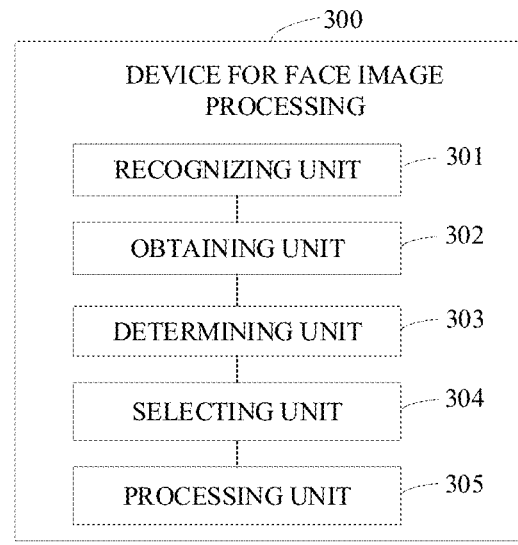
FIG. 8 is a schematic structural diagram illustrating a device for face image processing according to a first embodiment.

According to embodiments, a device for face image processing is further provided. The device can be integrated with a server. As illustrated in FIG. 8, a device 300 for face image processing includes a recognizing unit 301, an obtaining unit 302, a determining unit 303, a selecting unit 304, and a processing unit 305.

The recognizing unit 301 is configured to recognize a face image to obtain a recognition result.

In embodiments, the face image can be obtained in a variety of manners. As an example, the face image is collected by an electronic device through a camera of the electronic device in real time or is pre-stored in the electronic device. As another example, the face image is obtained from a network. Specifically, the face image is obtained from a message sent by a friend through an Instant Messenger App (e.g., WeChat®). Face image recognition can be comprehended as recognizing a face in the face image. The recognition result can be used to determine a person to whom respective face image belongs.

The obtaining unit 302 is configured to obtain an image adjustment parameter set according to the recognition result.

In embodiments, the image adjustment parameter set includes multiple groups of image adjustment parameters. The image adjustment parameters are historical image adjustment parameters of the face in the face image, that is, previously-used image adjustment parameters. In some embodiments, the electronic device can record processing habits for different face images in a time period in the past, and can analyze and learn the processing habits of the user in the time period based on machine learning. The electronic device can generate image adjustment parameters for processing different face images through self-analysis and self-learning processes to obtain different image adjustment parameter sets.

In some embodiments, the image adjustment parameter is a luminance value, a exposure value, contrast, sharpness, a liquefaction value, a pixel blur radius, or other parameter values, which are not enumerated herein.

In some embodiments, the recognition result includes a personal-identity. The personal-identity is used to distinguish the person to whom the face in the face image stored in the electronic device belongs. The personal-identity includes, but is not limited to, an identity number, name, nickname, a serial number, or other information that is able to group face images of a same person into one category. In some embodiments, the obtaining unit 302 is configured to: obtain, from a preset identity set, a preset personal-identity that matches the personal-identity; and obtain a preset image adjustment parameter set corresponding to the preset personal-identity, and use the preset image adjustment parameter set as the recognition result to obtain the image adjustment parameter set.

In above embodiments, a correspondence relationship between personal-identities and image adjustment parameter sets is set in advance. In other words, image adjustment parameters corresponding to face images belonging to a same person will be grouped to a same image adjustment parameter set. As an example, when personal identity of a face image is recognized, the preset image adjustment parameter set is obtained from multiple image adjustment parameter sets according to the personal-identity.

The determining unit 303 is configured to determine a deflection angle of a face in the face image relative to a reference face in a reference face image.

The reference face image is used as a reference and may be any image that includes a face belonging to a same person as the face in the face image to be recognized.

The selecting unit 304 is configured to select a target image adjustment parameter from the image adjustment parameter set according to the deflection angle.

In embodiments, multiple groups of image adjustment parameters included in the image adjustment parameter set may include image adjustment parameters required for face images of different angles to achieve a preset effect such as a picture effect. For instance, a front-view image of a face and a side-view image of the same face are different. Therefore, according to the deflection angle of the face in the face image relative to the reference face in the reference face image, an orientation of the face in the face image can be determined, and the target image adjustment parameter to-be-selected can be determined.

In some embodiments, the selecting unit 304 is configured to: determine, from multiple preset angle intervals, a target angle interval to which the deflection angle belongs; obtain, from the image adjustment parameter set, a preset image adjustment parameter corresponding to the target angle interval; and use the preset image adjustment parameter as the target image adjustment parameter.

The processing unit 305 is configured to process the face image according to the target image adjustment parameter.

In embodiments, the manner in which the face image is processed according to the target image adjustment parameter may be various. As an example, an area to-be-adjusted in the face image is determined according to the target image adjustment parameter, and the area determined is adjusted according to the target image adjustment parameter obtained.

Figure 9:
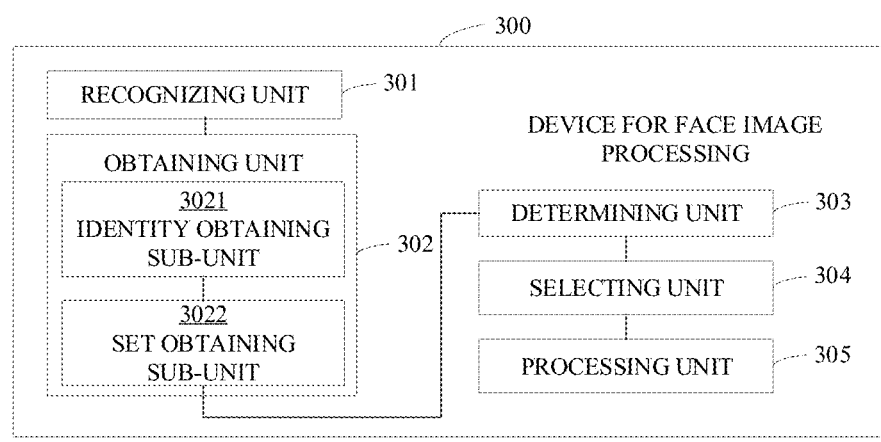
FIG. 9 is a schematic structural diagram illustrating a device for face image processing according to a second embodiment.

In some embodiments, the recognition result includes a personal-identity. As illustrated in FIG. 9, the obtaining unit 302 includes an identity obtaining sub-unit 3021 and a set obtaining sub-unit 3022. The identity obtaining sub-unit 3021 is configured to obtain, from a preset identity set, a preset personal-identity that matches the personal-identity. The set obtaining sub-unit 3022 is configured to obtain a preset image adjustment parameter set corresponding to the preset personal-identity, and use the preset image adjustment parameter set as the recognition result to obtain the image adjustment parameter set.

Figure 10:
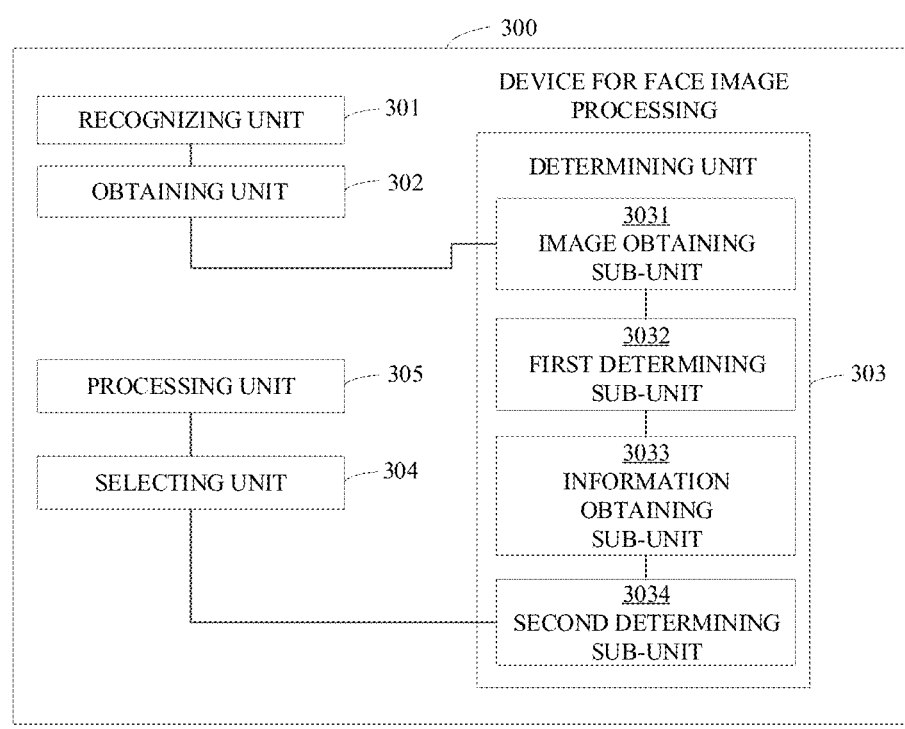
FIG. 10 is a schematic structural diagram illustrating a device for face image processing according to a third embodiment.

In some embodiments, as illustrated in FIG. 10, the determining unit 303 includes an image obtaining sub-unit 3031, a first determining sub-unit 3032, an information obtaining sub-unit 3033, and a second determining sub-unit 3034. The image obtaining sub-unit 3031 is configured to obtain the reference face image corresponding to the face image according to the recognition result. The first determining sub-unit 3032 is configured to determine a first offset reference point in the reference face of the reference face image, and determine, in the face of the face image, a second offset reference point corresponding to the first offset reference point. The information obtaining sub-unit 3033 is configured to obtain position offset information of the second offset reference point relative to the first offset reference point. The second determining sub-unit 3034 is configured to determine, according to the position offset information, the deflection angle of the face in the face image relative to the reference face in the reference face image.

Figure 11:
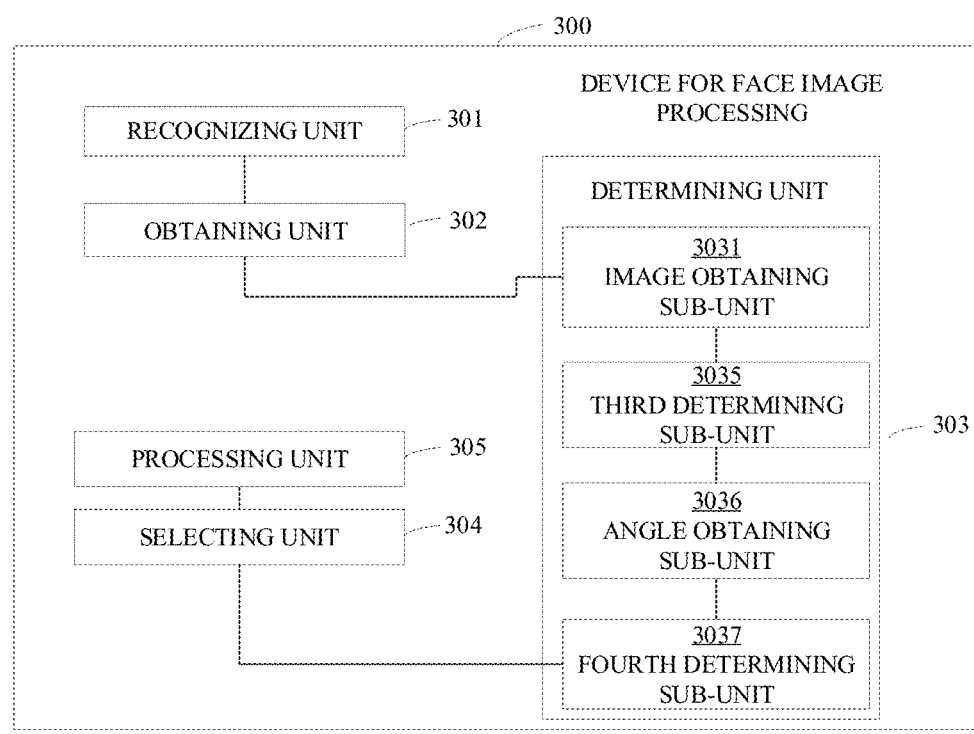
FIG. 11 is a schematic structural diagram illustrating a device for face image processing according to a fourth embodiment.

In some embodiments, as illustrated in FIG. 11, the determining unit 303 includes the image obtaining sub-unit 3031, a third determining sub-unit 3035, an angle obtaining sub-unit 3036, and a fourth determining sub-unit 3037. The image obtaining sub-unit 3031 is configured to obtain the reference face image corresponding to the face image according to the recognition result. The third determining sub-unit 3035 is configured to determine a first reference vector in the face of the face image, and determine, in the reference face of the reference face image, a second reference vector corresponding to the first reference vector. The angle obtaining sub-unit 3036 is configured to determine an angle between the first reference vector and the second reference vector. The fourth determining sub-unit 3037 is configured to determine, according to the angle, the deflection angle of the face in the face image relative to the reference face in the reference face image.

Figure 12:
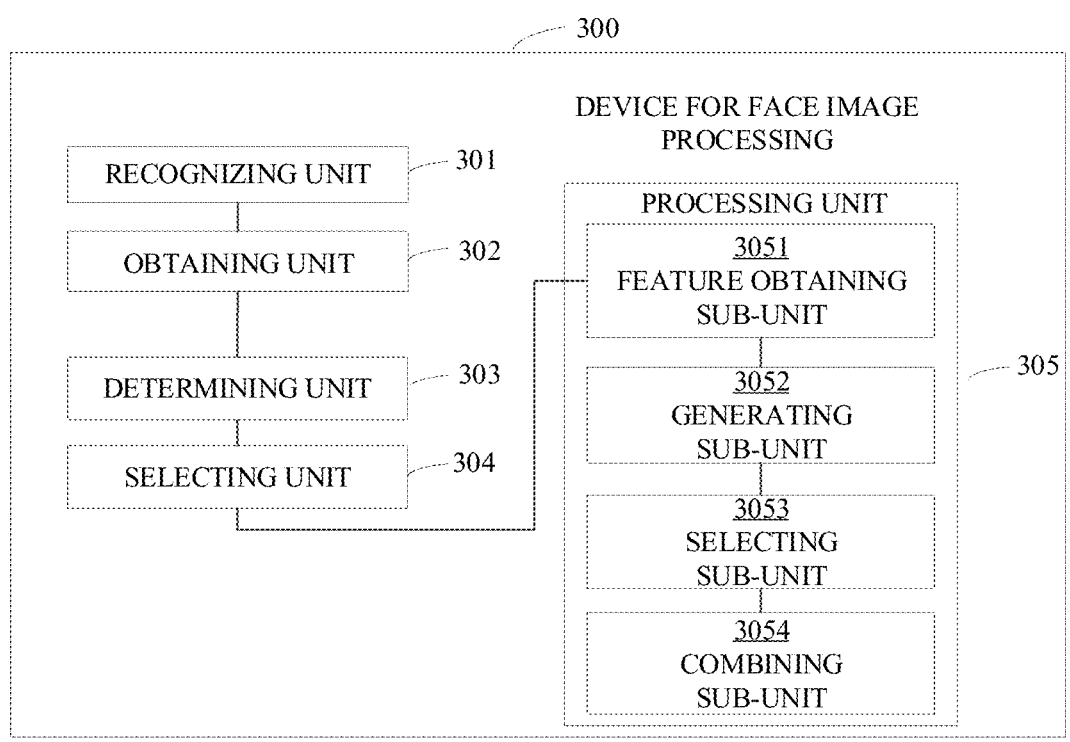
FIG. 12 is a schematic structural diagram illustrating a device for face image processing according to a fifth embodiment.

In some embodiments, as illustrated in FIG. 12, the processing unit 305 includes a feature obtaining sub-unit 3051, a generating sub-unit 3052, a selecting sub-unit 3053, and a combining sub-unit 3054. The feature obtaining sub-unit 3051 is configured to obtain multiple image features of the face image. The generating sub-unit 3052 is configured to, for each of the multiple image features, generate an initial layer corresponding thereto, to obtain a layer set. The selecting sub-unit 3053 is configured to select and adjust, according to the target image adjustment parameter, at least one target layer from the layer set. The combining sub-unit 3054 is configured to combine the at least one target layer adjusted with unselected initial layers in the layer set.

In some embodiments, the multiple image features may include color features, shape features, texture features, and spatial relationship features. In some embodiments, the face image is analyzed, and an initial layer corresponding to each image feature is generated according to a analysis result. For example, a color feature corresponds to a color layer that characterizes colors of the face image, and a shape feature corresponds to a shape layer that characterizes shape of the face image.

Since not all image features need to be modified, there may be parameters having a null value in the target image adjustment parameter, therefore, only parameters whose values are not null in the target image adjustment parameter are used. Accordingly, at least one target layer corresponding to at least one feature to-be-modified is selected for adjustment from a layer set according to at least one parameter whose value is not null, to obtain at least one target layer adjusted. The at least one target layer adjusted is then combined with remaining unadjusted initial layers to synthesize a processed face image.

In some embodiments, the recognition result includes a personal-identity. The obtaining unit 302 is configured to: obtain, from a preset identity set, a preset personal-identity that matches the personal-identity; and obtain a preset image adjustment parameter set corresponding to the preset personal-identity, and use the preset image adjustment parameter set as the recognition result to obtain the image adjustment parameter set.

In some embodiments, the selecting unit is configured to: determine, from multiple preset angle intervals, a target angle interval to which the deflection angle belongs; obtain, from the image adjustment parameter set, a preset image adjustment parameter corresponding to the target angle interval; and use the preset image adjustment parameter as the target image adjustment parameter.

According to the device for face image processing of embodiments, the recognition result can be obtained by recognizing the face image. The image adjustment parameter set is obtained according to the recognition result. The deflection angle of the face in the face image relative to the reference face in the reference face image is determined. The target image adjustment parameter is selected from the image adjustment parameter set according to the deflection angle determined. The face image is processed according to the target image adjustment parameter. By adopting the present disclosure, according to the result of the recognition of the face image and the deflection angle of the face in the face image, the target image adjustment parameter can be determined from the image adjustment parameter set to process the face image, without manually determining how to adjust the face image, thereby improving speed and efficiency of image processing and reducing operating time while reducing power consumption of an electronic device.

According to embodiments, a non-transitory computer readable storage medium is further provided. The non-transitory computer readable storage medium is configured to store instructions. The instructions, when executed by a processor, cause the processor to carry out any of the foregoing methods for face image processing.

Figure 13:
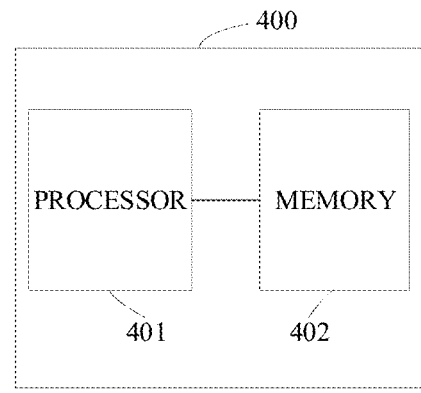
FIG. 13 is a schematic structural diagram illustrating an electronic device according to embodiments.

According to embodiments, an electronic device is further provided. The electronic device may be a device such as a smart phone, a tablet computer, or the like. As illustrated in FIG. 13, an electronic device 400 includes at least one processor 401 and a computer readable storage (e.g., a memory) 402. The processor 401 is electrically coupled with the memory 402.

The processor 401 is a control center of the electronic device 400. The processor 401 is configured to connect various parts of the entire electronic device 400 through various interfaces and lines, configured to execute various functions of the electronic device and process data by running or loading programs stored in the memory 402 and invoking data stored in the memory 402, thereby monitoring the electronic device 400.

In this embodiment, the processor 401 of the electronic device 400 is configured to load instructions corresponding to processes of one or more programs into the memory 402 according to following operations, and to run programs stored in the memory 402, thereby implementing various functions. A face image is recognized to obtain a recognition result. An image adjustment parameter set is obtained according to the recognition result. A deflection angle of a face in the face image relative to a reference face in a reference face image is determined. A target image adjustment parameter is selected from the image adjustment parameter set according to the deflection angle. The face image is processed according to the target image adjustment parameter.

In some embodiments, the processor 401 is configured to: obtain the reference face image corresponding to the face image according to the recognition result; determine a first offset reference point in the reference face of the reference face image; determine, in the face of the face image, a second offset reference point corresponding to the first offset reference point; obtain position offset information of the second offset reference point relative to the first offset reference point; and determine, according to the position offset information, the deflection angle of the face in the face image relative to the reference face in the reference face image.

In some embodiments, the processor 401 is configured to: obtain the reference face image corresponding to the face image according to the recognition result; determine a first reference vector in the face of the face image; determine, in the reference face of the reference face image, a second reference vector corresponding to the first reference vector; determine an angle between the first reference vector and the second reference vector; and determine, according to the angle, the deflection angle of the face in the face image relative to the reference face in the reference face image.

In some embodiments, the processor 401 is configured to: determine a first feature point and a second feature point in the face image; determine the first reference vector according to the first feature point and the second feature point.

In some embodiments, the processor 401 is configured to: obtain multiple image features of the face image; for each of the multiple image features, generate an initial layer corresponding thereto, to obtain a layer set; select, according to the target image adjustment parameter, at least one target layer from the layer set for adjustment; combine the at least one target layer adjusted with unselected initial layers in the layer set.

In some embodiments, the recognition result includes a personal-identity, and the processor 401 configured to obtain the image adjustment parameter set according to the recognition result is configured to: obtain, from a preset identity set, a preset personal-identity that matches the personal-identity; obtain a preset image adjustment parameter set corresponding to the preset personal-identity, and use the preset image adjustment parameter set as the recognition result to obtain the image adjustment parameter set.

In some embodiments, the processor 401 is configured to: determine, from multiple preset angle intervals, a target angle interval to which the deflection angle belongs; obtain, from the image adjustment parameter set, a preset image adjustment parameter corresponding to the target angle interval; use the preset image adjustment parameter as the target image adjustment parameter.

The memory 402 is configured to store programs and data. The programs stored in the memory 402 include instructions that are executable in the processor. The programs can form various functional modules. The processor 401 executes various functional applications and data processing by running the programs stored in the memory 402.

Figure 14:
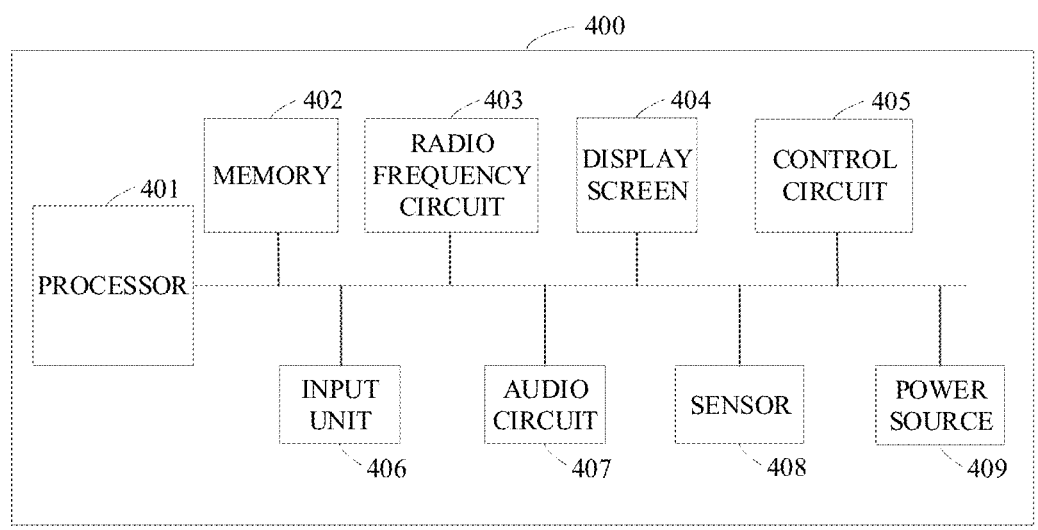
FIG. 14 is a schematic structural diagram illustrating an electronic device according to other embodiments.

In some embodiments, as illustrated in FIG. 14, the electronic device 400 further includes a radio frequency circuit 403, a display screen 404, a control circuit 405, an input unit 406, an audio circuit 407, a sensor 408, and a power source 409. The processor 401 is electrically coupled with the radio frequency circuit 403, the display screen 404, the control circuit 405, the input unit 406, the audio circuit 407, the sensor 408, and the power source 409, respectively.

The radio frequency circuit 403 is configured to transmit and receive (i.e., transceive) radio frequency signals to communicate with a server or other electronic devices through a wireless communication network.

The display screen 404 is configured to display information entered by a user or information provided for the user as well as various graphical user interfaces of the electronic device. The graphical user interface may be composed of images, text, icons, video, and any combination thereof.

The control circuit 405 is electrically coupled with the display screen 404 and is configured to control the display screen 404 to display information.

The input unit 406 is configured to receive inputted digits information, character information, or user feature information (e.g., fingerprints), and to generate, according to user settings and function controls, keyboard-based, mouse-based, joystick-based, optical or trackball signal inputs, and other signal inputs.

The audio circuit 407 is configured to provide an audio interface between a user and the electronic device through a speaker and a microphone.

The sensor 408 is configured to collect external environmental information. The sensor 408 may include one or more of an ambient light sensor, an acceleration sensor, an angular velocity sensor (e.g., a gyroscope), and the like.

The power source 409 is configured for power supply of various components of electronic device 400. In some embodiments, the power source 409 may be logically coupled with the processor 401 via a power management system to enable management of charging, discharging, and power consumption through the power management system.

Although not illustrated in FIG. 14, the electronic device 400 may further include a camera, a Bluetooth module, and the like, and the disclosure will not elaborate herein.

According to the electronic device of embodiments, the recognition result can be obtained by recognizing the face image. The image adjustment parameter set is obtained according to the recognition result. The deflection angle of the face in the face image relative to the reference face in the reference face image is determined. The target image adjustment parameter is selected from the image adjustment parameter set according to the deflection angle determined. By adopting the present disclosure, according to the result of the recognition of the face image and the deflection angle of the face in the face image, the target image adjustment parameter can be determined from the image adjustment parameter set to process the face image, without manually determining how to adjust the face image, which can improve speed and efficiency of image processing and reduce operating time while reducing power consumption of an electronic device.

It will be understood by those of ordinary skill in the art that all or a part of the various methods of the embodiments described above may be accomplished by means of a program to instruct associated hardware, the program may be stored in a computer-readable memory, which may include a read-only memory (ROM), a random access memory (RAM), Disk or compact disc (CD), and so on.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for face image processing, comprising:
recognizing a face image to obtain a recognition result;
obtaining an image adjustment parameter set according to the recognition result;
obtaining a reference face image corresponding to the face image according to the recognition result;
determining a first reference vector in a face of the face image;
determining, in a reference face of the reference face image, a second reference vector corresponding to the first reference vector;
determining an angle between the first reference vector and the second reference vector;
determining, according to the angle, a deflection angle of the face in the face image relative to the reference face in the reference face image;
selecting a target image adjustment parameter from the image adjustment parameter set according to the deflection angle; and
processing the face image according to the target image adjustment parameter.

2. The method of claim 1, wherein determining the first reference vector in the face of the face image comprises:
determining a first feature point and a second feature point in the face image; and
determining the first reference vector according to the first feature point and the second feature point.

3. The method of claim 1, wherein processing the face image according to the target image adjustment parameter comprises:
obtaining a plurality of image features of the face image;
for each of the plurality of image features, generating an initial layer corresponding thereto, to obtain a layer set;
selecting, according to the target image adjustment parameter, at least one target layer from the layer set and adjusting the at least one target layer; and
combining the at least one target layer adjusted with unselected initial layers in the layer set.

4. The method of claim 1, wherein the recognition result comprises a personal-identity, and obtaining the image adjustment parameter set according to the recognition result comprises:
obtaining, from a preset identity set, a preset personal-identity that matches the personal-identity; and
obtaining a preset image adjustment parameter set corresponding to the preset personal-identity, and using the preset image adjustment parameter set as the recognition result to obtain the image adjustment parameter set.

5. The method of claim 1, wherein selecting the target image adjustment parameter from the image adjustment parameter set according to the deflection angle comprises:
determining, from a plurality of preset angle intervals, a target angle interval to which the deflection angle belongs;
obtaining, from the image adjustment parameter set, a preset image adjustment parameter corresponding to the target angle interval; and
using the preset image adjustment parameter as the target image adjustment parameter.

6. A non-transitory computer readable storage medium, configured to store instructions which, when executed by a processor, cause the processor to carry out actions, comprising:
recognizing a face image to obtain a recognition result;
obtaining an image adjustment parameter set according to the recognition result;
obtaining a reference face image corresponding to the face image according to the recognition result;
determining a first offset reference point in a reference face of the reference face image;
determining, in a face of the face image, a second offset reference point corresponding to the first offset reference point;
obtaining position offset information of the second offset reference point relative to the first offset reference point;
determining, according to the position offset information, a deflection angle of the face in the face image relative to the reference face in the reference face image;
selecting a target image adjustment parameter from the image adjustment parameter set according to the deflection angle; and
processing the face image according to the target image adjustment parameter.

7. The non-transitory computer readable storage medium of claim 6, wherein the instructions executed by the processor to carry out the action of processing the face image according to the target image adjustment parameter are executed by the processor to carry out actions, comprising:
obtaining a plurality of image features of the face image;
for each of the plurality of image features, generating an initial layer corresponding thereto, to obtain a layer set;
selecting, according to the target image adjustment parameter, at least one target layer from the layer set and adjusting the at least one target layer; and
combining the at least one target layer adjusted with unselected initial layers in the layer set.

8. The non-transitory computer readable storage medium of claim 6, wherein the instructions executed by the processor to carry out the action of obtaining the image adjustment parameter set according to the recognition result are executed by the processor to carry out actions, comprising:
obtaining, from a preset identity set, a preset personal-identity that matches a personal-identity, wherein the recognition result comprises the personal-identity; and
obtaining a preset image adjustment parameter set corresponding to the preset personal-identity, and using the preset image adjustment parameter set as the recognition result to obtain the image adjustment parameter set.

9. The non-transitory computer readable storage medium of claim 6, wherein the instructions executed by the processor to carry out the action of selecting the target image adjustment parameter from the image adjustment parameter set according to the deflection angle are executed by the processor to carry out actions, comprising:
determining, from a plurality of preset angle intervals, a target angle interval to which the deflection angle belongs;
obtaining, from the image adjustment parameter set, a preset image adjustment parameter corresponding to the target angle interval; and
using the preset image adjustment parameter as the target image adjustment parameter.

10. An electronic device, comprising:
at least one processor; and
a non-transitory computer readable storage, coupled to the at least one processor and storing at least one computer executable instruction thereon which, when executed by the at least one processor, is operable with the at least one processor to:

recognize a face image to obtain a recognition result;
obtain an image adjustment parameter set according to the recognition result;
determine a deflection angle of a face in the face image relative to a reference face in a reference face image;
select a target image adjustment parameter from the image adjustment parameter set according to the deflection angle;
obtain a plurality of image features of the face image;
for each of the plurality of image features, generate an initial layer corresponding thereto, to obtain a layer set;
select, according to the target image adjustment parameter, at least one target layer from the layer set and adjust the at least one target layer; and
combine the at least one target layer adjusted with unselected initial layers in the layer set.

11. The electronic device of claim 10, wherein the at least one computer executable instruction operable with the at least one processor to determine the deflection angle of the face in the face image relative to the reference face in the reference face image is operable with the at least one processor to:
obtain the reference face image corresponding to the face image according to the recognition result;
determine a first offset reference point in the reference face of the reference face image;
determine, in the face of the face image, a second offset reference point corresponding to the first offset reference point;
obtain position offset information of the second offset reference point relative to the first offset reference point; and
determine, according to the position offset information, the deflection angle of the face in the face image relative to the reference face in the reference face image.

12. The electronic device of claim 10, wherein the at least one computer executable instruction operable with the at least one processor to determine the deflection angle of the face in the face image relative to the reference face in the reference face image is operable with the at least one processor to:
obtain the reference face image corresponding to the face image according to the recognition result;
determine a first reference vector in the face of the face image;
determine, in the reference face of the reference face image, a second reference vector corresponding to the first reference vector;
determine an angle between the first reference vector and the second reference vector; and
determine, according to the angle, the deflection angle of the face in the face image relative to the reference face in the reference face image.

13. The electronic device of claim 12, wherein the at least one computer executable instruction operable with the at least one processor to determine the first reference vector in the face of the face image is operable with the at least one processor to:
determine a first feature point and a second feature point in the face image; and
determine the first reference vector according to the first feature point and the second feature point.

14. The electronic device of claim 10, wherein the recognition result comprises a personal-identity, and the at least one computer executable instruction operable with the at least one processor to obtain the image adjustment parameter set according to the recognition result is operable with the at least one processor to:
obtain, from a preset identity set, a preset personal-identity that matches the personal-identity; and
obtain a preset image adjustment parameter set corresponding to the preset personal-identity, and use the preset image adjustment parameter set as the recognition result to obtain the image adjustment parameter set.

15. The electronic device of claim 10, wherein the at least one computer executable instruction operable with the at least one processor to select the target image adjustment parameter from the image adjustment parameter set according to the deflection angle is operable with the at least one processor to:
determine, from a plurality of preset angle intervals, a target angle interval to which the deflection angle belongs;
obtain, from the image adjustment parameter set, a preset image adjustment parameter corresponding to the target angle interval; and
use the preset image adjustment parameter as the target image adjustment parameter.

* * * * *